US012452822B2

United States Patent
Jiang et al.

(10) Patent No.: US 12,452,822 B2
(45) Date of Patent: Oct. 21, 2025

(54) POSITIONING PROCEDURES FOR USER EQUIPMENTS IN INACTIVE STATE

(71) Applicant: ZTE CORPORATION, Guangdong (CN)

(72) Inventors: Chuangxin Jiang, Shenzhen (CN); Guozeng Zheng, Shenzhen (CN); Yu Liu, Shenzhen (CN); Zhaohua Lu, Shenzhen (CN); Hao Wu, Shenzhen (CN); Huahua Xiao, Shenzhen (CN); Yu Pan, Shenzhen (CN); Shujuan Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 317 days.

(21) Appl. No.: 17/873,937

(22) Filed: Jul. 26, 2022

(65) Prior Publication Data

US 2022/0369271 A1 Nov. 17, 2022

Related U.S. Application Data

(63) Continuation of application No. PCT/CN2021/084316, filed on Mar. 31, 2021.

(51) Int. Cl.
*H04W 64/00* (2009.01)
*H04W 74/0833* (2024.01)
*H04W 74/0836* (2024.01)

(52) U.S. Cl.
CPC ........ *H04W 64/00* (2013.01); *H04W 74/0833* (2013.01); *H04W 74/0836* (2024.01)

(58) Field of Classification Search
CPC . H04W 64/00; H04W 4/029; H04W 74/0833; H04W 76/27; H04W 24/08; H04W 68/02; H04W 64/003; H04W 4/02; H04W 72/04; H04W 76/30; H04W 48/12; H04W 64/006; H04W 68/005;
(Continued)

(56) References Cited

U.S. PATENT DOCUMENTS 10,945,122 B2 * 3/2021 Gunnarsson .......... H04W 64/00
2007/0002806 A1 1/2007 Soomro
(Continued)

FOREIGN PATENT DOCUMENTS

CN 103781111 A 5/2014
CN 104980888 A 10/2015
(Continued)

OTHER PUBLICATIONS

Extended European Search Report for EP Appl. No. 21933959.5, dated Mar. 15, 2024 (8 pages).
(Continued)

*Primary Examiner* — Olumide Ajibade Akonai
(74) *Attorney, Agent, or Firm* — Foley & Lardner LLP

(57) ABSTRACT

Presented are systems, methods, apparatuses, or computer-readable media for performing positioning procedures. A wireless communication device may receive, from a wireless communication node, information to facilitate positioning of the wireless communication device. The wireless communication device may determine to initiate a positioning procedure while in radio resource control (RRC) inactive state. The wireless communication device may perform, while in RRC inactive state, the positioning procedure.

20 Claims, 9 Drawing Sheets

(58) Field of Classification Search
CPC ..... H04W 76/28; H04W 68/00; H04W 24/10; H04W 88/02; H04W 60/04; H04W 76/20; H04W 76/19; H04W 74/0836
See application file for complete search history.

(56) References Cited

U.S. PATENT DOCUMENTS

| | | | | |
|---|---|---|---|---|
| 2016/0366631 | A1* | 12/2016 | Crisci | H04W 64/00 |
| 2019/0253986 | A1 | 8/2019 | Jeon et al. | |
| 2019/0335477 | A1 | 10/2019 | Nam et al. | |
| 2019/0363843 | A1* | 11/2019 | Gordaychik | H04W 72/044 |
| 2020/0229130 | A1* | 7/2020 | Keating | H04W 52/0229 |
| 2020/0264261 | A1 | 8/2020 | Akkarakaran et al. | |
| 2020/0296736 | A1 | 9/2020 | Yokomakura et al. | |
| 2021/0037481 | A1 | 2/2021 | Kim et al. | |
| 2021/0400734 | A1* | 12/2021 | Zhang | H04W 72/21 |
| 2022/0103976 | A1* | 3/2022 | Gummadi | H04W 24/10 |
| 2022/0116902 | A1* | 4/2022 | Liu | H04W 4/029 |
| 2022/0120842 | A1* | 4/2022 | Edge | H04W 76/19 |
| 2024/0015762 | A1* | 1/2024 | Yerramalli | H04W 72/232 |
| 2024/0179789 | A1* | 5/2024 | Shah | H04W 4/70 |

FOREIGN PATENT DOCUMENTS

| | | | | |
|---|---|---|---|---|
| CN | 109391996 | A | 2/2019 | |
| WO | WO-2018203819 | A1 * | 11/2018 | ........... H04W 24/10 |
| WO | WO-2020/140668 | A1 | 7/2020 | |
| WO | WO-2020/146739 | A1 | 7/2020 | |
| WO | WO-2020/168573 | A1 | 8/2020 | |
| WO | WO-2020/197829 | A1 | 10/2020 | |
| WO | WO-2020/231307 | A1 | 11/2020 | |
| WO | WO-2021032280 | A1 * | 2/2021 | ........... G01S 5/0027 |
| WO | WO-2021/196099 | A1 | 10/2021 | |

OTHER PUBLICATIONS

Moderator (Ericsson), "Output of email discussion [100b-e-NR-Pos-03] on UL SRS for positioning and UL RTOA reference time", 3GPP TSG-RAN WG1 Meeting #100-e, R1-2002970, Apr. 30, 2020, e-Meeting (25 pages).
Huawei et al.: "TS 23.501: Location report procedure for UE in RRC inactive mode" SA WG2 Meeting #122Bis; S2-175848; Aug. 25, 2017; Sophia Antipolis, France (5 pages).
International Search Report and Written Opinion for PCT Appl. No. PCT/CN2021/084316, mailed Dec. 30, 2021 (8 pages).
Ad-Hoc Chair (Samsung), "Session notes for 8.1 (Further enhancements on MIMO for NR)", 3GPP TSG RAN WG1 Meeting #104-e, R1-2102191, Feb. 5, 2021, e-Meeting (20 pages).
Ad-Hoc Chair (Samsung), "Session notes for 8.1 (Further enhancements on MIMO for NR)", 3GPP TSG RAN WG1 Meeting #104-e, R1-2102250, Feb. 5, 2021, e-Meeting (20 pages).
Apple Inc., "On Multi-TRP Reliability Enhancement", 3GPP TSG-RAN WG1 Meeting #104-e, R1-2101351, Feb. 5, 2021, e-Meeting (12 pages).
Ericssom, "Summary of RAT dependent positioning methods in 7.2.10.3 at RAN1#95," 3GPP TSG-RAN WG1 #95, R1-1814005, Nov. 16, 2018, Spokane, United States (8 pages).
Extended European Search Report for EP Appl. No. 21932271.6, dated Dec. 7, 2023 (8 pages).
International Search Report and Written Opinion for PCT Appl. No. PCT/CN2021/083325, mailed Dec. 30, 2021 (6 pages).
International Search Report and Written Opinion for PCT Appl. No. PCT/CN2021/084896, mailed Jan. 4, 2022 (8 pages).
Moderator (CATT), "FL Summary #2 for accuracy improvements by mitigating UE Rx/Tx and/or gNB Rx/Tx timing delays", 3GPP TSG RAN WG1 Meeting #104-e, R1-2101951, Feb. 5, 2021, e-Meeting (57 pages).
Moderator (Nokia), "Summary #2 of Multi-TRP for PUCCH and PUSCH", 3GPP TSG RAN WG1 #104-e, R1-2101900, Feb. 5, 2021, e-Meeting (90 pages).
Moderator (Nokia), "Summary #3 of Multi-TRP for PUCCH and PUSCH", 3GPP TSG RAN WG1 #104-e, R1-2102060, Feb. 5, 2021, e-Meeting (44 pages).
Qualcomm Incorporated, "Enhancements on Multi-TRP for PDCCH, PUCCH and PUSCH", 3GPP TSG-RAN WG1 Meeting #104-e, R1-2101447, Feb. 5, 2021, e-Meeting (28 pages).
Vivo, "Further discussion on multi beam enhancement", 3GPP TSG RAN WG1 #104-e, R1-2100421, Feb. 5, 2021, e-Meeting (29 pages).
ZTE, "On NR PHR calculation," 3GPP TSG RAN WG1 Meeting #90, R1-1712313, Aug. 25, 2017, Prague, Czechia (6 pages).
Extended European Search Report for EP Appl. No. 21920148.0, dated Dec. 13, 2022 (9 pages).
Office Action for KR Appl. No. 10-2022-7026436, dated Oct. 24, 2024 (with English translation, 8 pages).

* cited by examiner

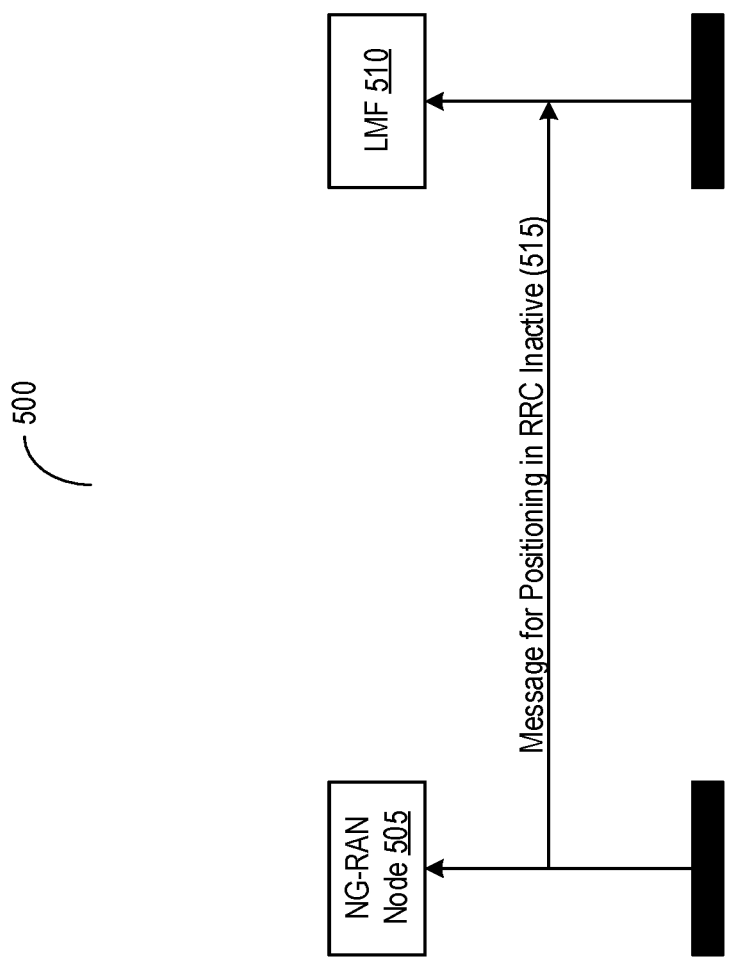

POSITIONING PROCEDURES FOR USER EQUIPMENTS IN INACTIVE STATE

CROSS-REFERENCE TO RELATED APPLICATION

This application claims the benefit of priority under 35 U.S.C. § 120 as a continuation of PCT Patent Application No. PCT/CN2021/084316, filed on Mar. 31, 2021, the disclosure of which is incorporated herein by reference in its entirety.

TECHNICAL FIELD

The disclosure relates generally to wireless communications, including but not limited to systems and methods for performing positioning procedures.

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions, have been simplified with some of them being software based so that they could be adapted according to need.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

At least one aspect is directed to a system, a method, an apparatus, or a computer-readable medium for performing positioning procedures. A wireless communication device may receive, from a wireless communication node, information to facilitate positioning of the wireless communication device. The wireless communication device may determine to initiate a positioning procedure while in radio resource control (RRC) inactive state. The wireless communication device may perform, while in RRC inactive state, the positioning procedure.

In some embodiments, the wireless communication device may receive, while in RRC inactive state, a message from the wireless communication node. The message may include at least one of: a request for location information, an indication to the wireless communication device to remain in RRC in active state, or assistance data for positioning. In some embodiments, the message may be carried in a paging message. In some embodiments, the message is carried in one or more of last 4 bits of a short message in the paging message or is carried via a physical downlink control channel (PDCCH) for paging.

In some embodiments, the wireless communication device may send, while in RRC inactive state, at least a portion of the location information to the wireless communication node via a message A or a message 3 of a physical random access channel (PRACH) procedure. In some embodiments, the wireless communication device may receive, from a wireless communication node via a system information block (SIB) or a master information block (MIB). The information may include an indication of at least one resource configured for the message A or a message 1 for positioning procedure in RRC inactive state.

In some embodiments, the wireless communication device while in RRC inactive state, the message from the wireless communication node, the message including at least one of: the assistance data for positioning, the request for location information, or a triggering indicator to initiate the positioning procedure in RRC inactive state. In some embodiments, the message may be a message B, a message 2, or a message 4 of a physical random access channel (PRACH) procedure.

In some embodiments, the wireless communication node is configured to send a capability message to a location management function (LMF) of a network. In some embodiments, the capability message indicative of whether the wireless communication node supports at least one of: a wireless communication device being accessed, performing data transmission or performing the positioning procedure in inactive state, the message carrying information to trigger the positioning procedure in RRC inactive state, a physical random access channel (PRACH) procedure with the wireless communication device while in RRC inactive state, or a physical uplink shared channel (PUSCH) resource for the wireless communication device to use while in RRC inactive state.

In some embodiments, the wireless communication device may receive, while in RRC inactive state, from a wireless communication node via a system information block (SIB) or a master information block (MIB), or a message in a paging message, an indication of a sounding reference signal (SRS) configuration or an indication to initiate SRS transmission.

In some embodiments, the wireless communication device may receive, while in RRC inactive state, a message from the wireless communication node or a location management function (LMF). The message may include at least one of: an indication of a sounding reference signal (SRS) configuration, an indication to initiate SRS transmission, or a triggering indicator to initiate the positioning procedure in RRC inactive state. The message may be a message B, a message 2, or a message 4 of a physical random access channel (PRACH) procedure.

In some embodiments, the wireless communication device may send, while in RRC inactive state, a capability of the wireless communication node or the LMF to support the SRS transmission, via a message A or a message 3 of a physical random access channel (PRACH) procedure.

In some embodiments, the wireless communication device may send, while in RRC inactive state, a configured physical uplink shared channel (PUSCH), or a message A or a message 3 in a physical random access channel (PRACH) procedure, comprising at least one of: a request for a triggering message to initiate SRS transmission for the positioning procedure, or a request for a SRS configuration.

In some embodiments, the wireless communication device may receive, while in RRC inactive state, from a wireless communication node via a system information block (SIB) or a master information block (MIB), assistance data for positioning and a sounding reference signal (SRS) configuration. In some embodiments, the wireless communication device may receive, while in RRC inactive state, a paging message from the wireless communication node. The paging message may include at least one of: a request for location information, a triggering message to initiate SRS transmission, or an indication to the wireless communication device to remain in RRC in active state.

At least one aspect is directed to a system, a method, an apparatus, or a computer-readable medium. A wireless communication node may transmit, to a wireless communication device, information to facilitate positioning of the wireless communication device. The wireless communication node may cause the wireless communication device to determine to initiate a positioning procedure while in radio resource control (RRC) inactive state, and performs the positioning procedure while in RRC inactive state.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIG. 5 illustrates a sequence diagram of a process of transferring a paging message from a next generation, radio access network (NG-RAN) node to a location management function (LMF) in accordance with an illustrative embodiment.

DETAILED DESCRIPTION

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

1. Mobile Communication Technology and Environment

Figure 1:
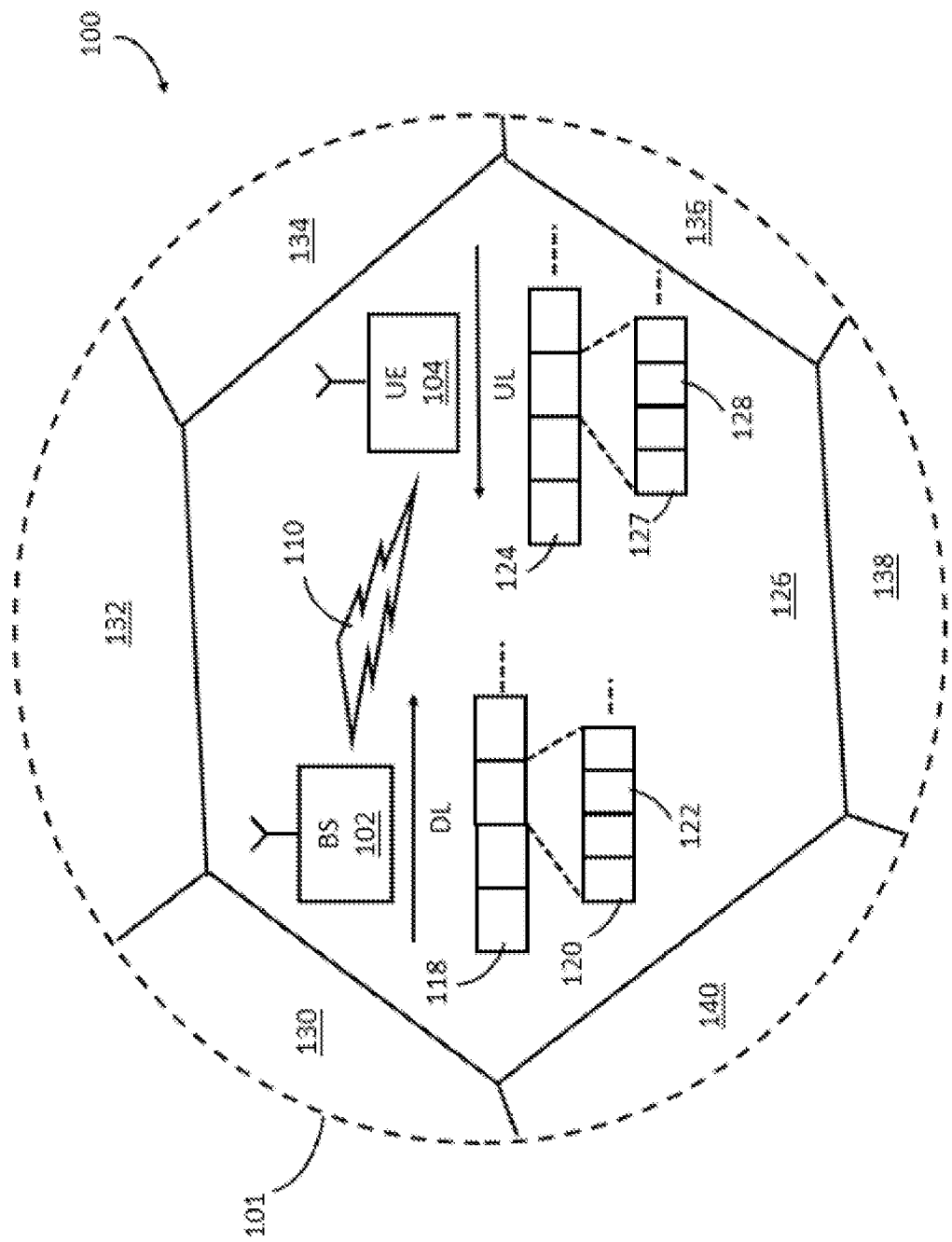
FIG. 1 illustrates an example cellular communication network in which techniques disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
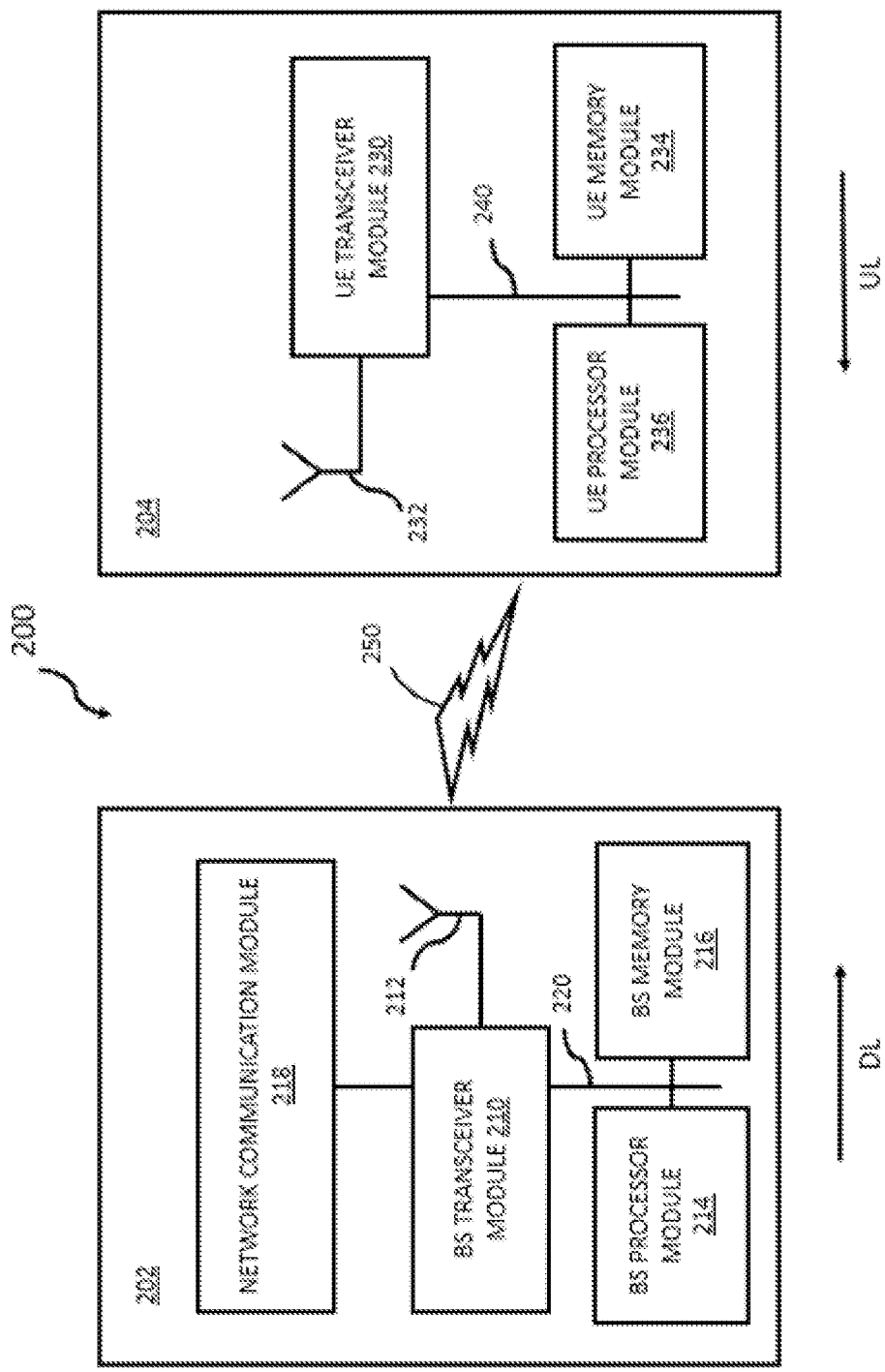
FIG. 2 illustrates a block diagram of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

2. Systems and Methods for Performing Positioning Procedures

To reduce positioning latency and efficiency, the positioning procedure may be triggered and starts in RRC inactive or idle state. A new message in paging information may be used to indicate positioning method, positioning location request, or even an uplink position reference signal (UL PRS) configuration or transmission triggering such that positioning results can be achieved fast while still keeping UE in inactive or idle state. Furthermore, the UL PRS configuration or transmission triggering can be carried by initial access message B, or message 2 or 4.

In wireless communications, a positioning service may be used in outdoor or indoor settings. In outdoor scenarios, a global positioning system (GPA) can be used for positioning. In indoor scenarios, the GPS signal power may be too weak to ascertain accurate positioning estimation. To account for this, tireless dependent positioning solutions may be used, such as timing difference based positioning solution.

Radio technologies (e.g., 3rd Generation Partnership Project (3GPP) new radio (NR)) may be used to provide enhanced location capabilities. The operation in low and high frequency bands (e.g., bands below and above 6 GHz) and utilization of massive antenna arrays can provide additional degrees of freedom to substantially improve the positioning accuracy. The possibility of using wide signal bandwidth in low and especially in high bands may bring new performance bounds for user location for well-known positioning techniques, utilizing timing measurements to locate UE. Massive antenna systems can provide additional degrees of freedom to enable more accurate user location by exploiting spatial and angular domains of propagation channel in combination with time measurements Various location technologies may be used to support regulatory as well as commercial use cases. Under the specification, the target horizontal positioning requirements for commercial use cases may be less than 3 m (80%) for indoor scenarios and less than 10 m (80%) for outdoor scenarios. The higher accuracy location requirements for new applications and industries may, however, be higher. The specifications may define parameters related to high accuracy (e.g., horizontal and vertical), low latency, network efficiency (e.g., scalability and reference signal (RS) overhead), and device efficiency (e.g., power consumption and complexity), among others, for commercial uses cases. The specifications for general commercial uses may include: a horizontal position accuracy of less than 1 m for 90% of UEs, a vertical position accuracy of less than <3 m for 90% of UEs, end-to-end latency for position estimation of UE of less than 100 ms, and physical layer latency for position estimation of UE of less than 10 ms. The specifications for industrial internet of things (IIoT) applications may include: a horizontal position accuracy of less than 0.2 m for 90% of UEs, a vertical position accuracy of less than 1 m for 90% of UEs, End-to-end latency for position estimation of UE of less than 100 ms (in the order of 10 ms is desired), and a physical layer latency for position estimation of UE of less than 10 m.

To satisfy these position accuracy specifications, many approaches may be considered, such as line-of-sight (LoS) path identification to find the receive signal path or multiple frequency layer aggregation to obtain higher solution in time domain, among others. Using such techniques, however, may not be able satisfy the latency requirement, especially when the UEs are in RRC inactive or idle states. In order to support positioning of a target UE and delivery of location assistance data to the UE, the location related functions may be distributed over the UE and the network.

Figure 3A:
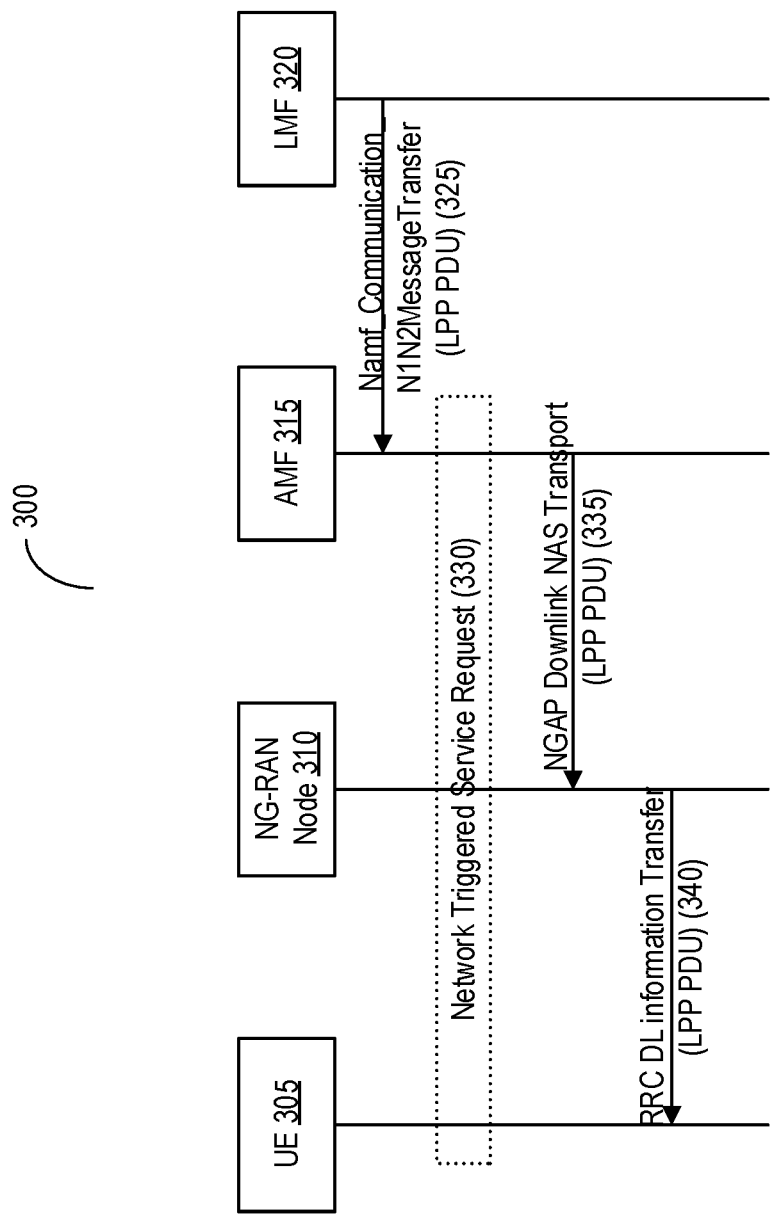
FIG. 3A illustrates a sequence diagram of a process for a long-term evolution (LTE) positioning procedure (LPP) protocol data unit (PDU) transfer between a location management function (LMF) and a user equipment (UE) in a network-triggered case in accordance with an illustrative embodiment.

Referring now to FIG. 3A, depicted is a sequence diagram of a process 300 for a long-term evolution (LTE) positioning procedure (LPP) protocol data unit (PDU) transfer between a location management function (LMF) and a user equipment (UE) in a network-triggered case. The process 300 may be implemented using an UE 305, a next generation (NG) radio access network (RAN) node 310, an access and mobility management function (AMF) 315, and a location management function (LMF) 320. The AMF 320, LMF 315, and NG-RAN node 310 (or gNB) may be sometimes collectively referred to as the network. When the AMF 315 receives a Location Service Request (325), the AMF may perform a network triggered service request (330) in order to establish a signalling connection with the UE and assign a specific serving gNB or ng-eNB. The UE may be in a connected mode before the beginning of positioning procedure. That is, any signalling that might bring the UE to connected mode may occur prior to positioning signaling transport. The AMF 315 may send an NG application protocol (NGAP) downlink non-access startum (NAS)

transport via a LPP PDU transfer to the NG-RAN node 310 (335). The NG-RAN node 310 in turn may send a radio resource control (RRC) downlink (DL) information transfer to the UE 305 via a LPP PDU (340).

Figure 3B:
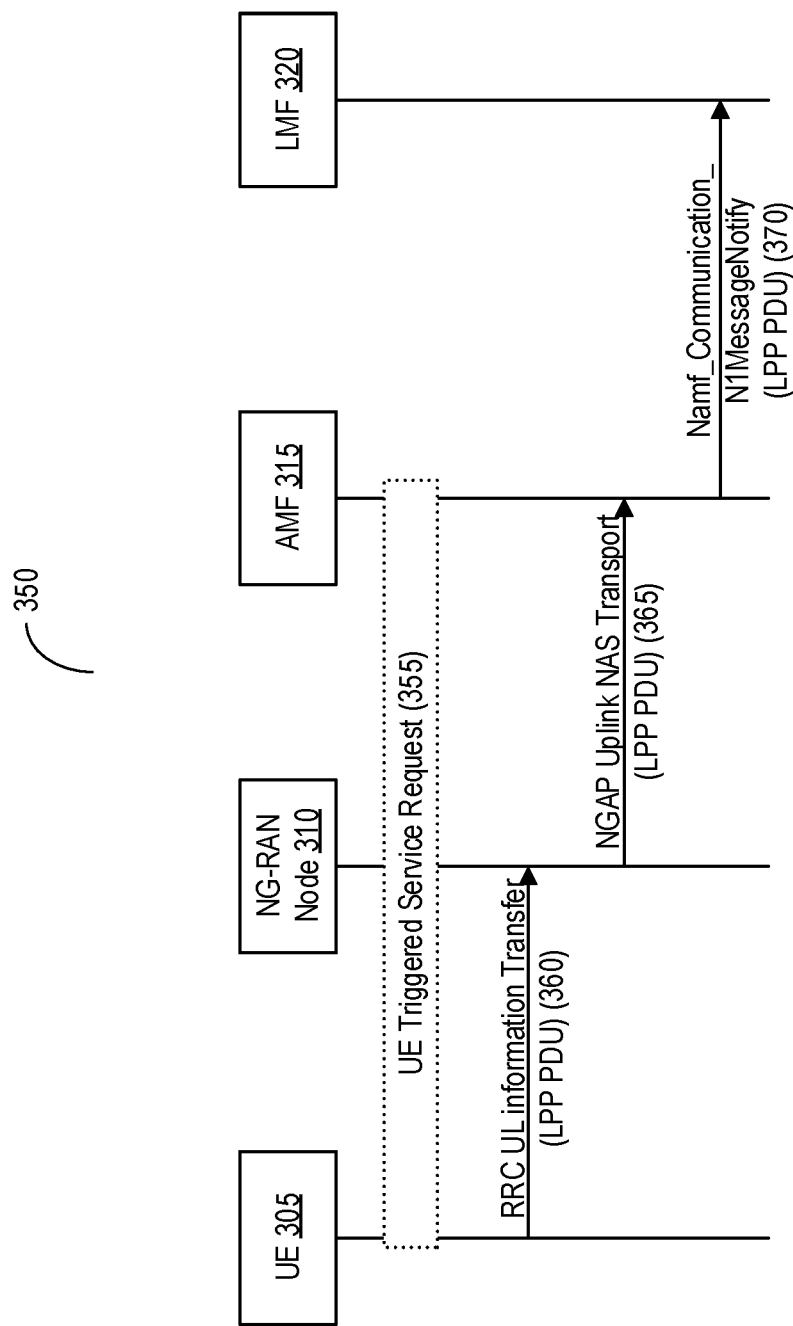
FIG. 3B illustrates a sequence diagram of a process for a long-term evolution (LTE) positioning procedure (LPP) protocol data unit (PDU) transfer between a location management function (LMF) and a user equipment (UE) in a UE-triggered case in accordance with an illustrative embodiment.

Referring now to FIG. 3B, depicted is a sequence diagram of a process 350 for a long-term evolution (LTE) positioning procedure (LPP) protocol data unit (PDU) transfer between a location management function (LMF) and a user equipment (UE) in a UE-triggered case. The process 350 may be implemented using an UE 305, a next generation (NG) radio access network (RAN) node 310, an access and mobility management function (AMF) 315, and a location management function (LMF) 320. The AMF 320, LMF 315, and NG-RAN node 310 (or gNB) may be sometimes collectively referred to as the network. When UE triggers positioning service request (355), UE may access RRC connection state first if UE is not in RRC connection state, such as UE is in RRC in active state or in idle state. The UE 305 may send a RRC uplink (UL) information transfer via LPP PDU to the NG-RAN node 310 (360). The NG-RAN 310 may in turn send a NGAP uplink NAS transport via LPP PDU to the AFM 315 (365). The AFM 315 may send a message via LPP PDU to notify the LMF 320 (370). In processes 300 or 350, the signaling from LMF 320 to UE 305 or from UE 305 to LMF 320 may be transmitted via LPP signaling, but should be transferred by gNB/eNB since UE only communicates with gNB/eNB (e.g., NG-RAN 310).

Overall, when UE is in RRC inactive state or in idle state, UE may have to access in RRC connection mode first. Then the UE can start a positioning procedure to obtain a connection with gNB/eNB or LMF. After positioning measurement or report, the UE can enter RRC inactive or idle state again. However, transitioning from RRC inactive or idle state to RRC active state may entail a significant amount of time latency and power consumption, thereby contravening the specifications for various applications.

To reduce positioning latency and improve power efficiency when the UE is in the RRC inactive or idle state, positioning procedure, such as positioning measurement, report, location calculation, or UL positioning reference signal (PRS) transmission, among others, while UE remains in RRC inactive state or idle state may be performed. All the details in regard to positioning, however, may not be clear a priori while the UE is in the RRC inactive or idle state. The details may include which positioning methods can be supported, how signaling or UL positioning RS or positioning report can be transmitted from the UE. If UE based positioning method is used, UE may calculate the location based on measurement results by itself or measurement results sent from the network. If UE assisted or network based positioning method is used, UE may report its measurement result to network. Then the network may calculate UE's location based on measurement results reported by UE or results measured by networks, among others.

A. Downlink Positioning Method

For downlink (DL) positioning methods (e.g., DL time difference of arrival (TDOA) or DL angle of departure (AOD) positioning), the LMF or some other positioning management (e.g., gNB or a gNB center) can configure PRS configuration in PRS assistance data (e.g., via LPP signaling). Specifically, in the DL-TDOA positioning method, the UE position may be estimated based on a DL reference signal time difference (DL-RSTD) and DL PRS reference signal received power (RSRP) measurements taken at the UE of DL radio signal from multiple NR transmission-reception points (TRPs), along with geographical coordinates of the TRPs and relative DL timing.

Figure 4A:
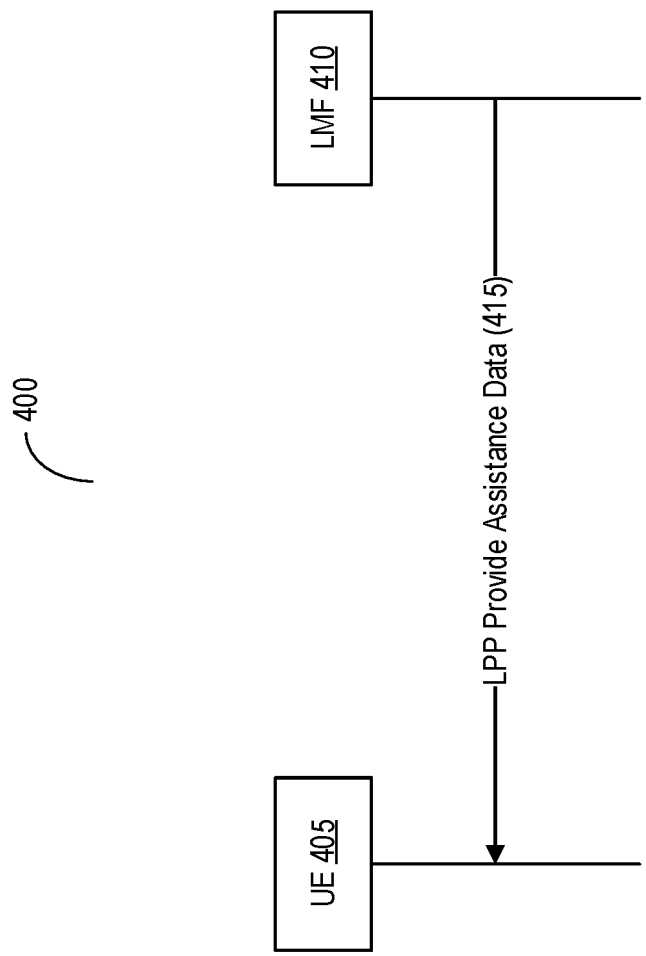
FIG. 4A illustrates a sequence diagram of a process for a location management function (LMF) initiated assistance data delivery procedure in accordance with an illustrative embodiment.

Referring now to FIG. 4A, depicted is a sequence diagram of a process 400 for a location management function (LMF) initiated assistance data delivery procedure. The process 400 may be implemented using a UE 405 and LMF 410. As depicted, the LMF 405 can initiate assistance data delivery procedure (415). That is, LMF 410 may transmit assistance data to UE 405 via LPP signaling. The LPP signaling may include DL PRS configuration and reference TRP, among others.

Figure 4B:
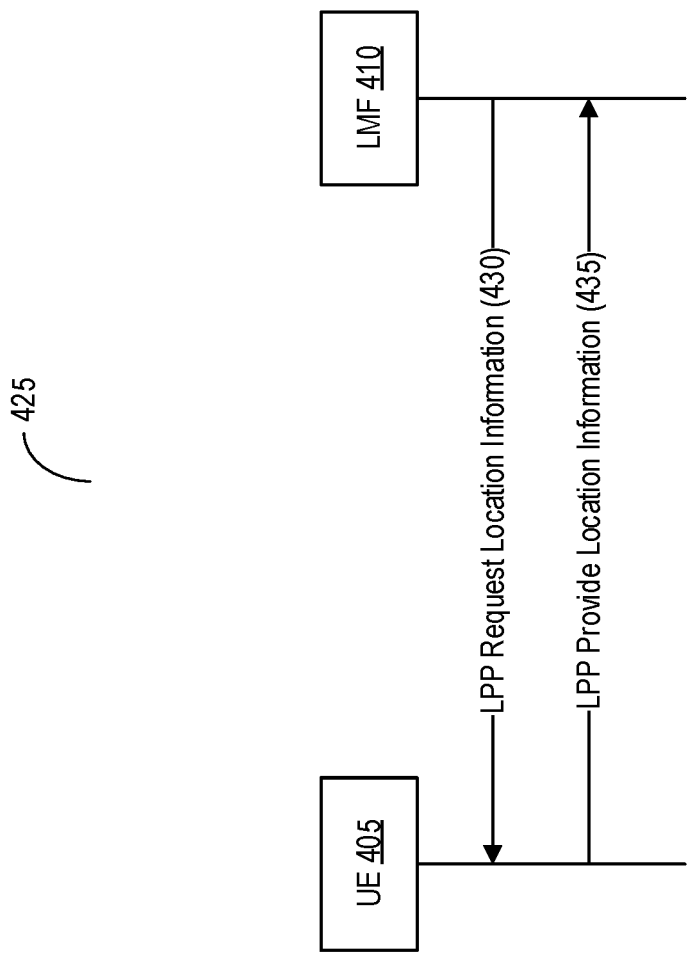
FIG. 4B illustrates a sequence diagram of a process for a location management function (LMF) initiated location information transfer procedure in accordance with an illustrative embodiment.

Referring now to FIG. 4B, depicted is a sequence diagram of a process 425 for a location management function (LMF) initiated location information transfer procedure. The process 420 may be implemented using a UE 405 and LMF 410. As depicted, the LMF 410 can initiate a location information transfer procedure (430). After obtaining measurement results, UE 405 will provide location information to the LMF 410 (435)

Figure 4C:
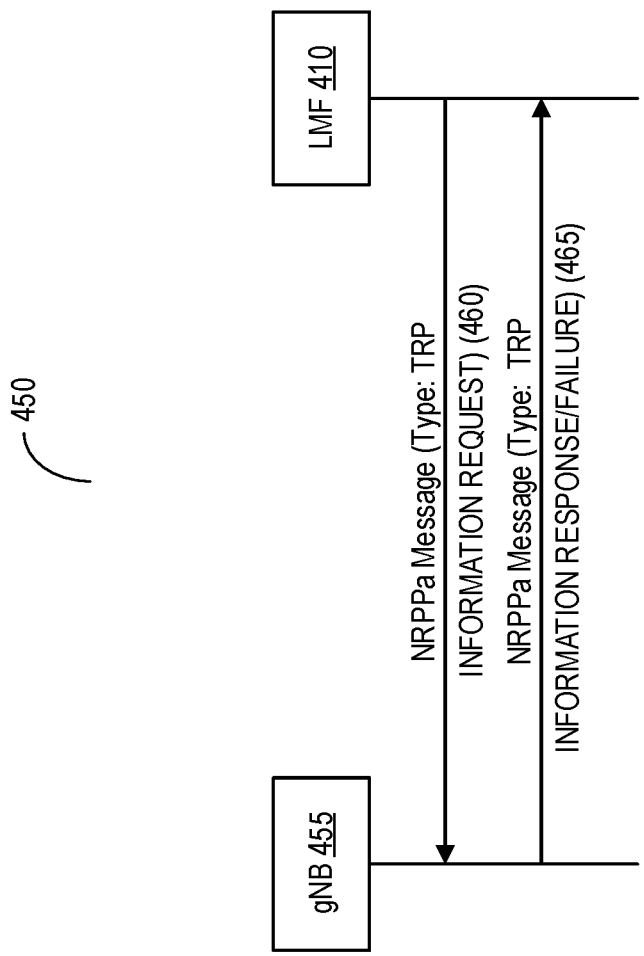
FIG. 4C illustrates a sequence diagram of a process for a location management function (LMF) initiated assistance data delivery procedure in accordance with an illustrative embodiment.

Referring now to FIG. 4C, depicted is a sequence diagram of a process 450 for a location management function (LMF) initiated assistance data delivery procedure. The process 450 may be implemented using a gNB 455 and LMF 410. As depicted, the LMF 410 and the gNB 455 may use NR positioning protocol A (NRPPa) signaling to perform positioning. Signaling may be communicated LMF 410 or one or more base stations (e.g., gNB 455). The LMF 410 may send a NRPPa message to the gNB 455 (460), and the gNB 455 in turn may return message to the LMF 410 (465) to perform the positioning.

I. Network-Triggered Positioning Procedure

One example of the UE conditions may be assumed as described in Table 1-1. Positioning method may be assumed to include DL TDOA in which UE measures time difference of received DL PRS from multiple TRPs or gNBs. UE may send feedback the measurement results to network. Positioning mode may be assumed as network based positioning. Under network-based positioning, network (e.g., the LMF) may calculate UE location based on measurement results reported from UE. The network rather than UE may trigger positioning procedure, or positioning service. Assistance data may include PRS configuration, reference TRP, or PRS, among others, and can be cell specific (e.g., broadcasted by a system information block (SIB)) for UEs in inactive state or idle state. Thus, assistance data may be already received before network triggering positioning procedure. After transitioning to the access inactive state, UE may still stay in previous serving cell (e.g., a timer is not expired). In such case, some RRC signaling configured by previous serving cell or base station can still be used. If UE moved to another cell (while still in inactive state), however, the RRC signaling configured by previous serving cell or base station cannot be used anymore.

TABLE 1-1

Assumptions for Network-Triggered Positioning

| Positioning method | Positioning mode | Triggers positioning procedure | Broadcast Assistance data | Inactive state |
|---|---|---|---|---|
| DL TDOA | Network based | Network | Yes | Moved to neighbor cell |

If network (e.g., LMF or AMF) triggers positioning service for a UE in RRC inactive state or idle state, to reduce latency, a new message may be carried in paging message to initiate positioning procedure while still allowing the UE to stay in RRC inactive/idle state.

Under step 1, the LMF (or some other location management) may trigger location information request or LMF sends location information request to UE. The location information request may be carried by a new message in paging message sending to UE. The location information request carried by the new message in paging can be LPP location information request. For instance, the message may be an element of NR-DL-TDOA-RequestLocationInformation that includes configuration of nr-DL-PRS-RstdMeasurementInfoRequest, nr-RequestedMeasurements, or additionalPaths-r16, among others.

The new message in paging may inform the UE to still stay in RRC inactive state rather than going to RRC connection. The new message in paging can inform UE some other information such as signaling to notify the UE whether the positioning procedure is involved in the next step for positioning. The new message in paging can be carried by paging a short message or the scheduling information for Paging is carried. Specifically, the new message can be indicated by one or more of last 4 bits of short message. The new message can also be carried by a physical downlink control channel (PDCCH) for paging, i.e. PDCCH scrambled by a paging radio network temporary identifier (P-RNTI).

Under step 2, the UE may measure PRS and acquire measurement results, such as obtaining location information based on configuration informed in assistance data broadcasted by SIB or signaling informed by the first step (e.g., location information request informed or carried by paging message). Under step 3a, the UE may transmit initial access message A. For example, the UE may perform a two-step physical random access channel (PRACH) procedure if two step PRACH procedure is used by UE. The whole or part of location information can be carried by message A. The message A resource(s) can be dedicated resources informed by SIB or MIB which is dedicated for positioning in RRC inactive or idle state. Under Step 3b, UE may perform a four-step PRACH procedure if four step PRACH procedure is used by UE. The whole or part of location information can be carried by message 3. The message 1 resource(s) can be dedicated resources informed by SIB or MIB which is dedicated for positioning in RRC inactive or idle state. The message 1 may be a PRACH transmission.

In step 3 or 3a, if the whole location information cannot be completely transmitted via message A or 3, the remaining location information can be transmitted by scheduled PUSCH after message A or 3. Under step 3c, the location information can be transmitted by scheduled PUSCH after message A or 3. Under Step 4, the LMF may calculate UE location based on location information reported by UE in step 3a or 3b or 3c. It is noted that one of step 3a, 3b and 3b may be performed. Also, UE may remain in RRC inactive or idle state in any of above steps.

Referring now to FIG. 5, depicted is a sequence diagram of a process 500 of transferring a paging message from an next generation, radio access network (NG-RAN) node to a location management function (LMF). The process 500 may be implemented using a next generation, radio access network (NG-RAN) node 505 and a location management function (LMF) 510. In step 1, since paging or DCI scheduling paging is transmitted by a base station, the base station (e.g., NG-RAN node 505) may determine whether location request is triggered by the LMF (e.g., LMF 510) or other location manager or location server. The base station can then send the paging information (e.g., via paging or DCI scheduling paging) to inform UE start positioning procedure while in RRC inactive state (or idle state) (515).

The base station may then trigger the new message by paging information. If LMF does not send positioning request to base station, the base station may not send the new message by paging information. Paging may be used for other applications rather than positioning (e.g., system information update). In such a case, gNB may notify the LMF some information including whether the gNB (or base station) support paging or broadcast the dedicated PRACH for UEs being access data transmission or positioning procedure in RRC inactive state. The message may be to notify the LMF 510 about positioning in RRC inactive or idle state.

The message can include the following one or more information. The information may indicate whether the NG-RAN node support the new feature. The feature may include, for example, support UEs being access data transmission or positioning procedure in RRC inactive state and. support a new message carrying by paging information to trigger positioning procedure in RRC inactive state or in idle state. The information may indicate whether the NG-RAN node has dedicated PRACH or message A of initial access resource for UEs being accessed for transmission or reception or positioning procedure in RRC inactive state or idle state. The information may also include whether the NG-RAN node or the UE has dedicated PUSCH resource for the UE being accessed for transmission or reception or positioning procedure in RRC inactive state or idle state.

If positioning mode is UE based, all the procedure described above may be similar. The difference may be that UE will calculate UE location information and report the provided location information (e.g. UE coordinates) in UE based positioning in step 3. In some embodiments, in above step 1, the new message carried by paging information can be used to inform UE assistance data for positioning (e.g., when assistance data for positioning is not broadcasted by SIB or a master information block (MIB)).

In some embodiments, in step 3, if UE still stays in previous serving cell, the configured grant physical uplink shared channel (PUSCH) resources configured by previous RRC signaling (e.g., RRC release signaling) can be used to report location information. The initial access message A or message 3 can be replaced by configured PUSCH in above step 3 (3a, 3b or 3c). In some embodiments, the initial access message B, or message 2 or message 4 information or resources can be used to carry assistance data for positioning or carry location request or a triggering indicator to start location procedure. In such case, UE may report location information after receiving initial access message B, or message 2 or message 4 information or resources. In some embodiments, the steps detailed above can be used with other positioning methods, such as the DL DOA positioning method.

II. UE-Triggered Positioning Procedure

Another example of the UE conditions may be assumed as described in Table 1-2. Positioning method may be assumed to include DL TDOA. Positioning mode may be assumed to be network based positioning. It may be assumed that the UE rather than network triggers positioning procedure, or positioning service. Assistance data may include PRS configuration, reference TRP or PRS, among others, and may can be cell specific (e.g., broadcasted by SIB for UEs in inactive state or idle state). Thus, Assistance data may already be received before network triggering positioning procedure. After access inactive state, UE may still stay in previous serving cell (e.g., when a timer is not expired). In such case, some RRC signaling configured by previous serving cell or base station can still be used. However, if UE moved to another cell (while still in inactive state), the RRC signaling configured by previous serving cell or base station cannot be used anymore.

TABLE 1-2

Assumptions for UE-Triggered Positioning Procedure

| Positioning method | Positioning mode | Triggers positioning procedure | Broadcast Assistance data | Inactive state |
|---|---|---|---|---|
| DL TDOA | Network based | UE | Yes | Moved to neighbor cell |

If UE triggers positioning service for a UE in RRC inactive state or idle state, paging sending from gNB may be omitted.

Under step 1, if positioning service is coming, UE may measure PRS and acquire measurement results, such as obtaining location information based on configuration informed in assistance data broadcasted by SIB. Step 1 may be implemented on the UE. Under step 2a, the UE may transmit message A. For example, the UE may perform a two-step PRACH procedure if two step PRACH procedure is used by UE. The whole or part of location information can be carried by message A. The message A resource(s) can be dedicated resources informed by SIB or MIB which is dedicated for positioning in RRC inactive or idle state. Under step 2b, UE may perform a four step RACH procedure if four step PRACH procedure is used by UE. The whole or part of location information can be carried by message 3. The message 1 resource(s) can be dedicated resources informed by SIB or MIB which is dedicated for positioning in RRC inactive or idle state. Message 1 may be PRACH transmission.

In step 2 or 2b, if the whole location information cannot be completely transmitted by message A or 3, the remaining location information can be transmitted by scheduled PUSCH after message A or 3. Under step 2c, the location information can be transmitted by scheduled PUSCH after message A or 3. Under step 3, the LMF may calculate UE location based on location information reported by UE in step 3a or 3b or 3c.

In above step 2, if UE still stays in previous serving cell, the configured grant PUSCH resources configured by previous RRC signaling (e.g., by RRC release signaling) can be used to report location information. Thus, initial access message A or message 3 can be replaced by configured PUSCH. All above approaches can also be used other positioning methods, such as DL DOA positioning method, UL DOA, or round trip time (RTT), among others.

B. Uplink Positioning Method

For UL positioning methods (e.g., UL TDOA and UL AOA positioning), LMF or some other positioning management (e.g., gNB or a base station) can configure UL PRS (may be named as a sounding reference signal (SRS) for transmission by UE for UL for positioning) by RRC signaling. Then, multiple base stations may measure the UL PRS and feedback the measurement results to LMF or UE.

Specifically, in the UL-TDOA positioning method, the UE position may be estimated based on UL relative time of arrival (RTOA) or UL-SRS-RSRP measurements acquired at different TRPs of uplink radio signals from UE, along with other configuration information. To obtain uplink measurements, the TRPs may determine the characteristics of the SRS signal transmitted by the UE for the time period for performing the uplink measurement. These characteristics may be static over the periodic transmission of SRS during the uplink measurements. Hence, the LMF may indicate to the serving gNB to direct the UE to transmit SRS signals for uplink positioning. The serving gNB may determine resources to be assigned and to communicate this SRS configuration information back to the LMF. The LMF can forward the SRS configuration to the TRPs. The gNB may decide (e.g., in case no resources are available) to configure no resources for the UE and report the empty resource configuration to the LMF.

In RRC connection state, gNB can use RRC signaling to notify UE RRC configuration. For aperiodic or semi-persistent SRS, gNB further use DCI or MACCE to trigger or activate SRS transmission. However, for UEs in RRC inactive or idle state, especially when UE has moved to a cell other than pervious serving cell, UE may first establish the RRC connection, and then obtain SRS configuration. This may cause large latency for UL positioning.

I. Example 1: Network-Triggered, Network-Based Uplink Time Distance of Arrival (TDOA) Positioning when UE Moves to Neighboring Cell For discussion, one example of the UE conditions may be assumed as described in Table 2-1. In this scenario, positioning method to be used may be UL TDOA in which multiple TRPs measure time difference of received UL PRS (SRS) from UE. TRPs may also provide feedback on the measurement results to LMF. Positioning mode may be assumed as network based positioning. The network (e.g., LMF) may calculate UE location based on measurement results reported from TRPs. It may be assumed that network rather than UE triggers positioning procedure, or positioning service. After access inactive state, UE may still stay in previous serving cell (e.g. a timer has not expired). In such case, some RRC signaling configured by previous serving cell or base station can still be used. However, if UE moved to another cell (still in inactive state), the RRC signaling configured by previous serving cell or base station cannot be used anymore.

TABLE 2-1

Assumptions for Example 1

| Positioning method | Positioning mode | Triggers positioning procedure | Inactive state |
|---|---|---|---|
| UL TDOA | Network based | network | Moved to neighbor cell |

If network (e.g., LMF or AMF) triggers positioning service for a UE in RRC inactive state or idle state, the following procedure may be employed to reduce latency.

Under step 1, a SRS configuration can be informed by SIB or MIB. SRS parameters can be configured in this manner, such as SRS bandwidth, comb size, and comb offset, among others. Some other SRS parameters can be configured by next step(s), such as SRS sequence ID. In some embodiments, multiple SRS configurations (e.g. multiple SRS resource sets) may be configured by SIB or MIB, or a subset of the multiple configurations.

Under Step 2a, UL TDOA positioning procedure can be triggered by a new message carried in paging message. In some embodiments, UL PRS configuration or UL PRS triggering can be carried by a new message in paging message. If all UL PRS configuration is carried by the new message, step 1 may be omitted. The new message can also be carried by PDCCH for paging (e.g., PDCCH scrambled by P-RNTI). The new message in paging may inform UE to still stay in RRC inactive state rather than going to RRC connection. The new message in paging may inform UE to still stay in RRC inactive state rather than going to RRC connection.

The new message can inform UE some other information, such as signaling to notify the UE whether the positioning procedure is involved in the next step or not. If not, there may be no positioning SRS to be transmitted. The new message in paging can be carried by paging short message or the scheduling information for Paging is carried. Specifically, the new message can be indicated by one or more of last 4 bits of short message.

Under step 3a, after obtaining the new message in paging for positioning, UE may perform a two-step RACH procedure if two step PRACH procedure is used by UE. In some embodiments, the UL PRS configuration or UL PRS triggering can be carried by message B. The message A resource(s) can be dedicated resources informed by SIB or MIB which is dedicated for positioning in RRC inactive or idle state. The UL capability (e.g., SRS capability supported by UE) can be carried by message A.

Under step 3b, the UE may perform four step RACH procedure if four step PRACH procedure is used by UE. In some case, The UL PRS configuration or UL PRS triggering can be carried by message 2 or message 4. The message 1 resource(s) can be dedicated resources informed by SIB or MIB which is dedicated for positioning in RRC inactive or idle state. The UL capability, i.e. SRS capability supported by UE can be carried by message 3. Under step 3c, the UL PRS configuration or UL PRS triggering can be carried in a PDCCH or PDSCH after message 2, 4 or message B. Under step 4, the UE may transmit SRS based on SRS configuration or triggering indicated in previous procedure. The TRPs may receive UL PRS and obtain measurement results. In the above procedure, SRS configuration may be performed in one of the steps.

II. Example 2: UE-Triggered, Network-Based Uplink Time Distance of Arrival (TDOA) Positioning when UE Moves to Neighboring Cell For discussion, one example of the UE conditions may be assumed as described in Table 2-2. Positioning method may be assumed to be UL TDOA in which multiple TRPs measure time difference of received UL PRS (SRS) from UE. TRPs may provide feedback on the measurement results to LMF. Positioning mode may be assumed as network based positioning, that is, network (usually is LMF) finally calculates UE location based on measurement results reported from TRPs. It may be assumed UE rather than network triggers positioning procedure, or positioning service. In such case, paging to trigger positioning procedure may be omitted since positioning procedure is triggered by UE. After access inactive state, UE may still remain in previous serving cell (e.g. a timer is not expired). In such case, some RRC signaling configured by previous serving cell or base station can still be used. However, if UE moved to another cell (while still in inactive state), the RRC signaling configured by previous serving cell or base station cannot be used anymore.

TABLE 2-2

Assumptions for Example 2

| Positioning method | Positioning mode | Triggers positioning procedure | Inactive state |
|---|---|---|---|
| UL TDOA | Network based | UE | Moved to neighbor cell |

Under step 1, SRS configuration can be informed by SIB or MIB. Some SRS parameters can be configured in this step, such as SRS bandwidth, comb size, and comb offset, among others. Some other SRS parameters can be configured by next step(s), (e.g., SRS sequence ID). In some embodiments, multiple SRS configurations (e.g., e.g. multiple SRS resource sets) may be configured by SIB or MIB, then a subset of the multiple configurations may be selected. In some embodiments, step 1 may be omitted.

Under step 2a, UE may perform a two-step RACH procedure if two step PRACH procedure is used by UE. The UL capability, i.e. SRS capability supported by UE can be carried by message A. The UL PRS configuration or UL PRS triggering information informed by base station can be carried by message B. UL PRS triggering information may include the mapping between DCI or MACCE trigger state and SRS resource set(s). The message A resource(s) can be dedicated resources informed by SIB or MIB which is dedicated for positioning in RRC inactive or idle state.

Under step 2b, UE may perform a four step RACH procedure if four step PRACH procedure is used by UE. The UL PRS configuration or UL PRS triggering can be carried by message 2 or message 4. The UL capability (e.g., SRS capability supported by UE) can be carried by message 3. The message 1 resource(s) can be dedicated resources informed by SIB or MIB which is dedicated for positioning in RRC inactive or idle state. Under step 2c, the UL PRS configuration or UL PRS triggering can be carried PDCCH or PDSCH after message 2, 4 or message B. Under step 3, the UE may transmit SRS based on SRS configuration informed in step 2. And the TRPs may receive UL PRS and obtain measurement results. In the above procedure, SRS configuration may not be omitted from step 1.

III. Example 3: Network-Triggered, Network-Based Uplink Time Distance of Arrival (TDOA) Positioning when UE Remains in Previous Serving Cell For discussion, one example of the UE conditions may be assumed as described in Table 2-3. Positioning method may be assumed to be UL TDOA in which multiple TRPs measure time difference of received UL PRS (SRS) from UE. TRPs may also provide feedback the measurement results to LMF. Positioning mode may be assumed as network based positioning. The network (e.g., LMF) may calculate UE location based on measurement results reported from TRPs. It may be assumed that the network rather than the UE triggers positioning procedure, or positioning service. After access inactive state, UE may still state in previous serving cell (e.g. a timer is not expired). In such case, some RRC signaling configured by previous serving cell or base station can still be used.

TABLE 2-3

Assumptions for Example 3

| Positioning method | Positioning mode | Triggers positioning procedure | Inactive state |
|---|---|---|---|
| UL TDOA | Network based | network | Still stay in the previous serving cell |

If the network (e.g., LMF or AMF) triggers positioning service for a UE in RRC inactive state or idle state, the following procedure may be employed to reduce latency.

Under step 1a, SRS configuration configured in RRC connection state can be reused. Under step 1b, SRS configuration is configured by RRC release signaling which is used to make UE access RRC inactive state or idle state.

Under step 2, UL TDOA positioning procedure can be triggered by a new message carried in paging message. UL PRS transmission triggering can be carried by a new message in paging message. The new message can also be carried by PDCCH for paging (e.g., PDCCH scrambled by P-RNTI). The new message in paging may inform UE to still stay in RRC inactive state rather than going to RRC connection. The new message can inform UE of other information such as signaling to notify the UE whether the positioning procedure is involved in the next step or not. If not, there may be no positioning SRS to be transmitted The new message in paging can be carried by paging short message or the scheduling information for Paging is carried. Specifically, the new message can be indicated by one or more of last 4 bits of short message. Under step 3, after obtaining the SRS triggering, UE may transmit SRS based on the signaling informed by paging and SRS configuration. UE may use configured grant PUSCH to report UL capability.

IV. Example 4: UE-Triggered, UE-Based Uplink Time Distance of Arrival (TDOA) Positioning when UE Remains in Previous Serving Cell For discussion, one example of the UE conditions may be assumed as described in Table 2-4. Positioning method may be assumed to be the UL TDOA in which multiple TRPs measure time difference of received UL PRS (SRS) from UE. TRPs may provide feedback the measurement results to LMF. The positioning mode may be assumed as network based positioning. The network (e.g., LMF) may finally calculate UE location based on measurement results reported from TRPs. It may be assumed UE rather than network triggers positioning procedure, or positioning service. After access inactive state, UE may still stay in previous serving cell (e.g. a timer is not expired). In such case, some RRC signaling configured by previous serving cell or base station can still be used.

TABLE 2-4

Assumption for Example 4

| Positioning method | Positioning mode | Triggers positioning procedure | Inactive state |
|---|---|---|---|
| UL TDOA | UE based | UE | Still stay in the previous serving cell |

Under step 1a, SRS configuration configured in RRC connection state can be reused. Under step 1b, SRS configuration may be configured by RRC release signaling which is used to make UE access RRC inactive state or idle state. Under step 2, the UE may transmit a configured PUSCH This information to notify gNB that UE is still staying this cell (and still in RRC inactive state). This information may be used to request SRS triggering for positioning in RRC inactive (or idle) state. Under step 3, the gNB may trigger SRS transmission. Under step 4, the UE transmits SRS based on gNB triggering.

C. Multiple Round Trip Time (RTT) Positioning Method

For a multi-RTT positioning method, both DL PRS and UL PRS may be used. The functions described above with respect to downlink positioning and uplink position may be also used.

In some embodiments, under step 1, SIB or MIB may broadcast both SRS configuration and positioning assistance data. Under step 2, the location information request may be carried by a new message in paging message sending to UE. Meanwhile, paging information may also trigger SRS transmission. Under step 3, the UE may transmit SRS. Under step 4, the UE may report location information.

In some embodiments, under step 1, SIB or MIB may broadcast positioning assistant data. Under step 2, the location information request may be carried by a new message in paging message sending to UE. Paging information may also include SRS configuration. Under step 3, the UE may perform two step or four steps initial access (e.g., PRACH procedure). Message B or 2 or 4 can be used to configure SRS configuration or triggering SRS transmission. Under step 4, the UE may report location information after step 3.

D. Method of Performing Positioning Procedures

Based on all aforementioned procedures, multiple positioning solutions or methods including DL TDOA, UL TDOA, DOA, and RTT, among others may be supported by UE. In such case, the new message in paging or initial access message B, or message 2 or 4 can be used to configure UE with the positioning method to be used.

Figure 6:
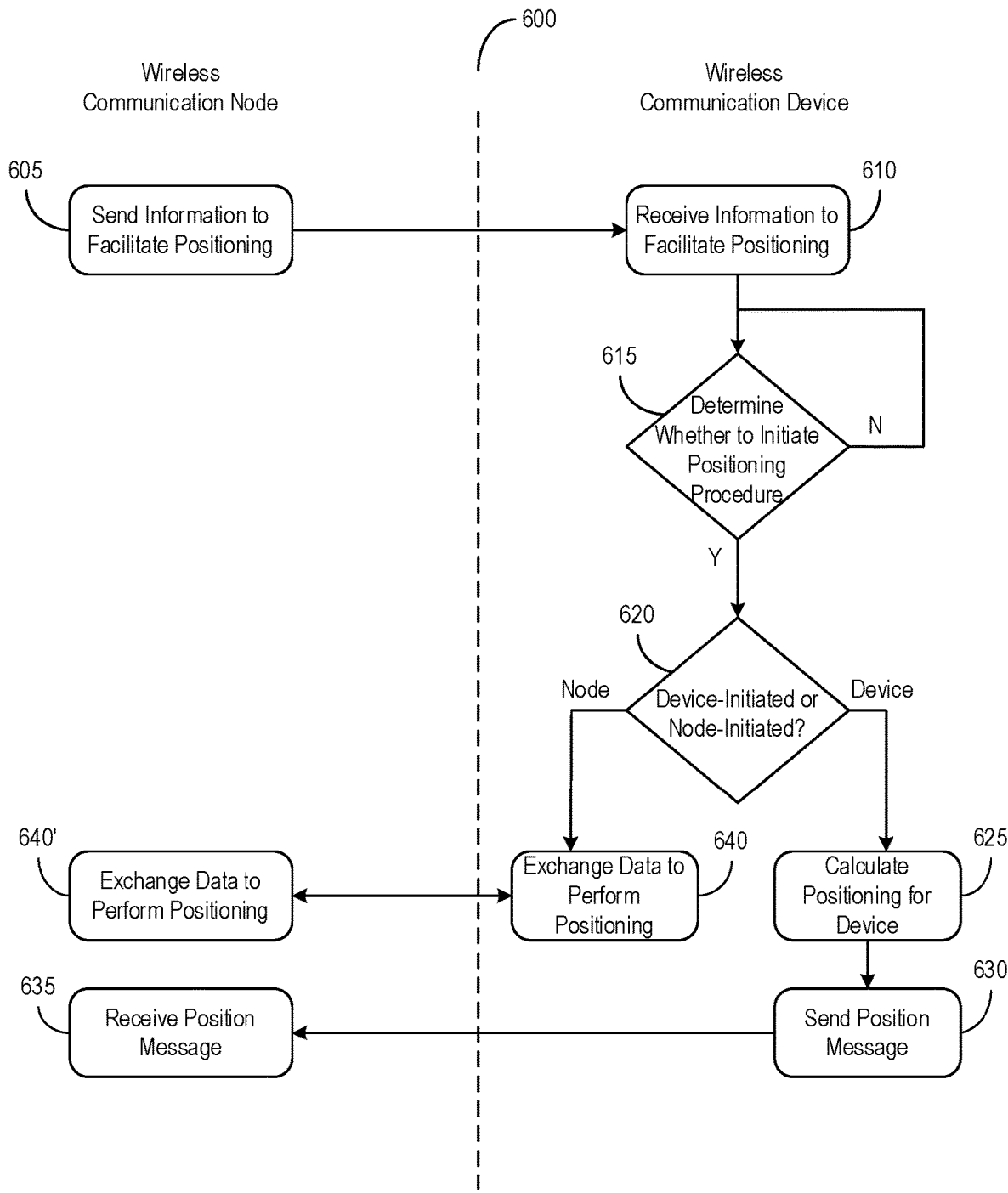
FIG. 6 illustrates a flow diagram of a method of performing positioning procedures in accordance with an illustrative embodiment.

Referring now to FIG. 6, depicted is a flow diagram of a method 600 of performing positioning procedures. The method 600 may be implemented using or performed by any of the components detailed above, such as the UE 104 or 204 and BS 102 or 202. In brief overview, a wireless communication node may send information to facilitate positioning (605). A wireless communication device may receive the information to facilitate positioning (610). The wireless communication device may determine whether to initiate a positioning procedure (615). When the determination is to initiate, the wireless communication device may determine whether the positioning procedure is device-initiated or node-initiated (620). When device-initiated, the wireless communication device may calculate a positioning for the wireless communication device (625). The wireless communication device may send a position message (630). The wireless communication node may receive the position message (635). When node-initiated, the wireless communication device and the wireless communication node may exchange data to perform positioning procedure (640 and 640').

In further detail, a wireless communication node (e.g., BS 102 or 202) may provide, transmit, broadcast, or otherwise send information to facilitate positioning to a wireless communication device (e.g., UE 104 or 204) (605). The information may include various parameters defining a positioning procedure to be performed by the wireless communication device in conjunction with the wireless communication node. The contents of the information may differ depending on whether the positioning procedure is uplink (UL) positioning, downlink (DL) positioning, or multi-round trip time (RTT) positioning. In some embodiments, the information may be included or identified in a message (sometimes referred herein as a new message) transmitted by the wireless communication node to the wireless communication device. In some embodiments, the information may be sent from the wireless communication node to the wireless communication device via a system information block (SIB) or a master information block (MIB).

The wireless communication node may transmit the information using the message, SIB, or the MIB. In some embodiments, the wireless communication node (or a location management function (LMF)) may generate the message to include or identify the information to facilitate positioning of the wireless communication device. Upon generation, the wireless communication node may send the message including the information to the wireless communication device. In some embodiments, the message including the information may be included, contained, or otherwise carried in a paging message. The paging message may be a type of message to be processed by the wireless communication device while in a radio resource control (RRC) inactive mode. In some embodiments, the message may be carried in one or more of last four bits of a short message in the paging message. The short message may be part of or associated with a subset field (e.g., one or more of the last four bits) of the paging message. In some embodiments, the message for facilitating positioning may be carried via a downlink channel, such as a physical downlink control channel (PDCCH) for paging. In some embodiments, the message for facilitating positioning may be a message B, message 2, or a message 4 of a physical random access channel (PRACH) procedure. In some embodiments, the wireless communication node may generate a SIB or a MIB to send the information to facilitate positioning. Upon generation, the wireless communication node may send the SIB or MIB to the wireless communication device.

In some embodiments, the wireless communication node may transmit, provide, or send the LMF of a network that the paging message is to be used in initiating the positioning procedure. In some embodiments, the wireless communication node may transmit, provide, or send a capability message to the LMF of the network. The capability message may identify or indicate whether the wireless communication node supports: the wireless communication device being accessed, performing data transmission, or performing the positioning procedure in inactive state; the message (e.g., paging message) carrying information to trigger the positioning procedure in RRC inactive state; a PRACH procedure with the wireless communication device while in the RRC inactive state; or a physical uplink shared channel (PUSCH) resource for the wireless communication device to use while in the RRC inactive state.

The message may be for a downlink positioning procedure to be performed by the wireless communication device in conjunction with the wireless communication node or by itself. When for downlink positioning, the message may include a request for location information. The request may indicate to the wireless communication device to initiate a positioning procedure. The positioning procedure to be carried out. The message may also include an indication to the wireless communication device to remain in RRC inactive or idle state. The message may also include assistance data for positioning. The assistance data may include parameters to be used by the wireless communication device in performing the positioning procedure. The parameter may include, for example, timing information to carry out time difference of arrival (TDOA) positioning, angle information for carrying out angle of departure (AOD) positioning, resources, resource sets, positioning reference signal (PRS) configuration, and geographic information (e.g., in geographic positioning system (GPS) data) of the wireless communication node, among others. In some embodiments, the message may include a trigger indicator to initiate the positioning procedure in the RRC inactive state. The trigger may indicate to the wireless communication device to initiate the positioning procedure. In some embodiments, the information included in the SIB or MIB may identify or indicate at least one resource configured for a message A or message 1 for the positioning procedure in the RRC in active state. The resource may be those dedicated for carrying out the positioning procedure in the RRC inactive or idle state.

The message may be for a uplink positioning procedure to be performed by the wireless communication device in conjunction with the wireless communication node or by itself. When for uplink positioning, the message may include or identify an indication of a sounding reference signal (SRS) configuration. The message may include or identify an indication to initiate the SRS transmission. In some embodiments, the message may include or identify a request for location information and the indication to remain in the RRC inactive state. The message may be in the paging message. The indication may specify the wireless communication device is to perform the SRS transmission to the wireless communication node as part of the positioning procedure. In some embodiments, the message may also include a trigger indicator to initiate the positioning procedure in the RRC inactive state. The trigger may indicate the wireless communication device to commence the positioning procedure while in the RRC inactive state. The SIB or MIB may also include or identify the indication of the SRS configuration or the indication to initiate the SRS transmission.

The information may be for a multi-round trip time (RTT) positioning procedure to be performed by the wireless communication device in conjunction with the wireless communication node. The information to be provided to the wireless communication device may include parameters for both UL positioning and DL positioning, such as those discussed above. The SIB or MIB may be used to send information associated with the UL positioning procedure. In some embodiments, the SIB or MIB may include or identify the assistance data for positioning. In some embodiments, the SIB or MIB may include or identify the SRS configuration. The message in the paging message may be used to send information associated with DL positioning. In some embodiments, the paging message may include the request for location information, the triggering message to initiate SRS transmission, or the indication to the wireless communication device to remain in RRC inactive state.

The wireless communication device may retrieve, identify, or otherwise receive the information to facilitate positioning from the wireless communication node (610). When the information is received, the wireless communication device may be in the RRC inactive state, idle state, off, sleep, or low-power state, among others, in contrast to the RRC active or connected state. While in the RRC inactive state, the wireless communication device may conserve power and consume a lower amount of resources relative to the RRC active or connected state. In some embodiments, the wireless communication device may be initially in an RRC active or connected state. When the information to facilitate the positioning procedure indicating that the wireless communication device is to be in RRC inactive state is received, the wireless communication device may transition or enter the RRC inactive state from the RRC active state.

In some embodiments, the wireless communication device may receive the message, SIB, or MIB including or identifying the information for facilitating positioning from the wireless communication node (or the LMF). Upon receipt of the message, the wireless communication device may parse the message (e.g., from the last four digits of the short message in the paging message), SIB, or MIB to identify various information for facilitating the positioning procedure. When the positioning procedure is for DL, the message, SIB, or MIB may include may include the request for location information, the indication to the wireless communication device to remain in RRC in active state, the assistance data for positioning, or the triggering indicator to indicator to initiate the positioning procedure, among others. When the procedure is for UL, the message, SIB, or MIB may include the indication of the SRS configuration, SRS configuration itself, or the indication to initiate SRS transmission, among others. When the procedure is for multi-RTT, the message, SIB, or MIB may include all the enumerated parameters.

The wireless communication device may determine whether to initiate a positioning procedure (615). The wireless communication may determine to initiate the positioning procedure while in the RRC inactive state in response to the information to facilitate positioning. In some embodiments, the wireless communication device may determine whether to initiate based on parsing the information to facilitate the positioning procedure. When the information includes request for location information or triggering indicator, the wireless communication device may determine to initiate the positioning procedure. Otherwise, the wireless communication may determine not to initiate the positioning procedure and wait to determine again. For example, a portion of the information lacking the request or the triggering indicator may have been received in the first message and the wireless communication device may wait for a second message that includes the request or the triggering indicator. Upon the determination, the wireless communication device may initiate and perform the positioning procedure.

When the determination is to initiate, the wireless communication device may identify or otherwise determine whether the positioning procedure is device-initiated or node-initiated (620). The determination may be based on the contents of the information to facilitate the positioning procedure. When the information includes the request for location information or triggering indicator, the wireless communication may determine that the positioning procedure is to be node-initiated. Otherwise, when the information lacks the request for location information or triggering indicator, the wireless communication may determine that the positioning procedure is to be device-initiated. For example, the information may lack the request for location information or the triggering indicator but may include the location assistance information.

In some embodiments, the wireless communication device may determine whether the positioning procedure is for DL positioning, UL positioning, or multi-RTT positioning. The determination may be based on the contents of the information to facilitate the positioning procedure. When the contents of the information include DL PRS configurations, the wireless communication device may determine that the positioning procedure is for DL positioning. When the contents of the information include SRS parameters for transmissions or UL PRS configurations, the wireless communication device may determine that the positioning procedure is for UL positioning. When the contents of the received information include parameters for both UL and DL transmissions, the wireless communication device may determine that the positioning procedure is to be multi-RTT positioning.

When the positioning procedure is device-initiated, the wireless communication device may determine or otherwise calculate a positioning for the wireless communication device (625). The calculation may be carried out while the wireless communication device is in RRC inactive or idle state. The wireless communication device may determine, calculate, or otherwise perform a measurement on at least one PRS to obtain location information. The measurement may be in terms of TDOA or AOD. In some embodiments, the wireless communication may use the assistance data to determine or obtain the location information for the positioning procedure. The assistance data may be included in the initially received information to facilitate the positioning procedure. The assistance data used to determine the location information may include, for example, timing information to carry out time difference of arrival (TDOA) positioning, angle information for carrying out angle of departure (AOD) positioning, resources, resource sets, positioning reference signal (PRS) configuration, and geographic information, among others.

In some embodiments, the wireless communication device and the wireless communication node may communicate data in performing the measurement. In some embodiments, the wireless communication device may transmit, provide, or otherwise send a configured physical uplink shared channel (PUSCH) to perform the positioning procedure. In some embodiments, the wireless communication device may also transmit, provide, or otherwise send a message A (e.g., in two-step) or a message 3 (e.g., in four-step) in a physical random access channel (PRACH) procedure. The PUSCH, message A, or the message 3 may include: a request for triggering message to initiate SRS transmission for the positioning procedure or a request for a SRS configuration, among others. Using the SRS, the wireless communication device may calculate the location information for the wireless communication device.

The wireless communication device may transmit, provide, or otherwise send a position message to the wireless communication node (630). With the performance of the measurement, the wireless communication device may generate the message to identify or include at least a portion of the obtained location information. Upon generation, the wireless communication device may send the portion of the location information to the wireless communication node. In some embodiments, the message including the location information may be a message A of a two-step PRACH procedure or a message 3 of a four-step PRACH procedure. The wireless communication node may retrieve, identify, or otherwise receive the position message from the wireless communication device (635).

When the positioning procedure is node-initiated, the wireless communication device and the wireless communication node may communicate or otherwise exchange data to perform positioning procedure (640 and 640'). While performing the positioning procedure, the wireless communication device may be in the RRC inactive or idle state. In some embodiments, the wireless communicate device and the wireless communication node may communicate the data using a PRACH procedure (e.g., two-step or four-step PRACH procedure). In some embodiments, the wireless communication device may provide, transmit, or otherwise send at least a portion of the location information to the wireless communicate node. The portion of the location information may be sent via a message A (e.g., in two-step) or a message 3 of a PRACH procedure (e.g., in four-step). In some embodiments, the wireless communicate device and the wireless communication node may communicate the data via a message (e.g., capability message). The wireless communication device may transmit, provide, or otherwise send a capability message of the wireless communication node or the LMF to support the SRS transmission. The capability message may be generated using the information regarding SRS configuration. The capability message may be sent via a message A (e.g., in two-step) or a message 3 (e.g., in four-step) of a PRACH procedure. Using the communicated, the wireless communication device or the wireless communication node may calculate a positioning for the wireless communication device. The wireless communication device may determine, calculate, or otherwise perform a measurement on at least one PRS to obtain location information. The measurement may be in terms of TDOA or AOD.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques.

To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller.

Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

What is claimed is:

1. A method comprising:
   receiving, by a wireless communication device while the wireless communication device is in a radio resource control (RRC) inactive state from a wireless communication node, information to facilitate positioning of the wireless communication device;
   determining, by the wireless communication device, to initiate a positioning procedure while in the RRC inactive state;
   identifying, by the wireless communication device while in the RRC inactive state, whether the positioning procedure is one of a device-initiated procedure or a network-initiated procedure based on the information; and
   performing, by the wireless communication device while in the RRC inactive state, the positioning procedure in accordance with the identification.

2. The method of claim 1, comprising:
   receiving, by the wireless communication device while in the RRC inactive state, a message from the wireless communication node, the message including at least one of: a request for location information, an indication to the wireless communication device to remain in the RRC inactive state, or assistance data for positioning.

3. The method of claim 2, wherein at least one of:
   the message is carried in a paging message;
   the message is carried in one or more of last 4 bits of a short message in the paging message; or
   the message is carried via a physical downlink control channel (PDCCH) for paging.

4. The method of claim 3, comprising:
   receiving, by the wireless communication device from the wireless communication node via a system information block (SIB) or a master information block (MIB), the information which includes an indication of at least one resource configured for the message A or a message 1 for positioning procedure in the RRC inactive state.

5. The method of claim 2, comprising:
   sending, by the wireless communication device while in the RRC inactive state, at least a portion of a location information to the wireless communication node via:
   a message A or a message 3 of a physical random access channel (PRACH) procedure.

6. The method of claim 2, comprising:
   receiving, by the wireless communication device while in the RRC inactive state, the message from the wireless communication node, the message including at least one of: the assistance data for positioning, the request for location information, or a triggering indicator to initiate the positioning procedure in the RRC inactive state,
   wherein the message is a message B or a message 2 or a message 4 of a physical random access channel (PRACH) procedure.

7. The method of claim 2, wherein the wireless communication node is configured to send a capability message to a location management function (LMF) of a network, the capability message indicative of whether the wireless communication node supports at least one of:
   a wireless communication device being accessed, performing data transmission or performing the positioning procedure in inactive state,
   the message carrying information to trigger the positioning procedure in the RRC inactive state,
   a physical random access channel (PRACH) procedure with the wireless communication device while in the RRC inactive state, or
   a physical uplink shared channel (PUSCH) resource for the wireless communication device to use while in the RRC inactive state.

8. The method of claim 1, comprising:
   receiving, by the wireless communication device while in the RRC inactive state, from the wireless communication node via a system information block (SIB) or a master information block (MIB), or a message in a paging message, an indication of a sounding reference signal (SRS) configuration or an indication to initiate SRS transmission.

9. The method of claim 8, comprising:
   sending, by the wireless communication device while in the RRC inactive state, a capability of the wireless communication node or the LMF to support the SRS transmission, via:
   a message A or a message 3 of a physical random access channel (PRACH) procedure.

10. The method of claim 1, comprising:
    receiving, by the wireless communication device while in the RRC inactive state, a message from the wireless communication node or a location management function (LMF), the message including at least one of: an indication of a sounding reference signal (SRS) configuration, an indication to initiate SRS transmission, or a triggering indicator to initiate the positioning procedure in the RRC inactive state,
    wherein the message is a message B or a message 2 or a message 4 of a physical random access channel (PRACH) procedure.

11. The method of claim 1, comprising:
    sending, by the wireless communication device while in the RRC inactive state, a configured physical uplink shared channel (PUSCH), or a message A or a message 3 in a physical random access channel (PRACH) procedure, comprising at least one of:
    a request for a triggering message to initiate SRS transmission for the positioning procedure, or
    a request for a SRS configuration.

12. The method of claim 1, comprising:
    receiving, by the wireless communication device while in the RRC inactive state, from a wireless communication node via a system information block (SIB) or a master information block (MIB), assistance data for positioning and a sounding reference signal (SRS) configuration; and
    receiving, by the wireless communication device while in the RRC inactive state, a paging message from the wireless communication node, the paging message including at least one of: a request for location information, a triggering message to initiate SRS transmission, or an indication to the wireless communication device to remain in the RRC inactive state.

13. A method comprising:

transmitting, by a wireless communication node to a wireless communication device while the wireless communication device is in a radio resource control (RRC) inactive state, information to facilitate positioning of the wireless communication device, wherein the wireless communication device while in the RRC inactive state determines to initiate a positioning procedure while in the RRC inactive state, identifies whether the positioning procedure is one of a device-initiated procedure or a network-initiated procedure based on the information, and performs the positioning procedure while in the RRC inactive state in accordance with the identification.

14. A wireless communication device comprising:

at least one processor configured to:

receive, via a receiver while the wireless communication device is in a radio resource control (RRC) inactive state, from a wireless communication node, information to facilitate positioning of the wireless communication device;

determine to initiate a positioning procedure while in the RRC inactive state;

identify whether the positioning procedure is one of a device-initiated procedure or a network-initiated procedure based on the information; and perform, while in the RRC inactive state, the positioning procedure in accordance with the identification.

15. A wireless communication node comprising:

at least one processor configured to:

transmit, via a transmitter to a wireless communication device while the wireless communication device is in a radio resource control (RRC) inactive state, information to facilitate positioning of the wireless communication device, wherein the wireless communication device determines to initiate a positioning procedure while in the RRC inactive state, identifies whether the positioning procedure is one of a device-initiated procedure or a network-initiated procedure based on the information, and performs the positioning procedure while in the RRC inactive state in accordance with the identification.

16. The wireless communication node of claim 15, wherein the at least one processor is further configured to:

transmit, via the transmitter while in the RRC inactive state, a message including at least one of: a request for location information, an indication to the wireless communication device to remain in the RRC inactive state, or assistance data for positioning.

17. The method of claim 16, wherein at least one of:

the message is carried in a paging message; or the message is carried in one or more of last 4 bits of a short message in the paging message or is carried via a physical downlink control channel (PDCCH) for paging.

18. The method of claim 17, wherein the at least one processor is further configured to:

transmit, via the transmitter to the wireless communication device via a system information block (SIB) or a master information block (MIB), the information which includes an indication of at least one resource configured for the message A or a message 1 for positioning procedure in the RRC inactive state.

19. The method of claim 16, wherein the at least one processor is further configured to:

receive, via a receiver, from the wireless communication device while in the RRC inactive state, at least a portion of a location information via:

a message A or a message 3 of a physical random access channel (PRACH) procedure.

20. The method of claim 16, wherein the at least one processor is further configured to:

transmit, via the transmitter, to the wireless communication device while in the RRC inactive state, the message, the message including at least one of: the assistance data for positioning, the request for location information, or a triggering indicator to initiate the positioning procedure in the RRC inactive state, wherein the message is a message B or a message 2 or a message 4 of a physical random access channel (PRACH) procedure.

* * * * *